United States Patent
Lohmann (10) Patent No.: US 11,961,650 B2
(45) Date of Patent: Apr. 16, 2024

(54) COIL ARRANGEMENT WITH REDUCED LOSSES AND A STABILIZED COUPLING FACTOR, AND SYSTEM FOR WIRELESS POWER TRANSFER

(71) Applicant: TDK Electronics AG, Munich (DE)

(72) Inventor: Thomas Lohmann, Solothurn (CH)

(73) Assignee: TDK Electronics AG, Munich (DE)

( * ) Notice: Subject to any disclaimer, the term of this patent is extended or adjusted under 35 U.S.C. 154(b) by 533 days.

(21) Appl. No.: 17/032,365

(22) Filed: Sep. 25, 2020

(65) Prior Publication Data

US 2021/0104348 A1 Apr. 8, 2021

(30) Foreign Application Priority Data

Oct. 8, 2019 (DE) .......................... 102019127004.9

(51) Int. Cl.
| | |
|---|---|
| H01F 27/28 | (2006.01) |
| H01F 27/08 | (2006.01) |
| H01F 27/24 | (2006.01) |
| H02J 50/10 | (2016.01) |
| H02J 50/70 | (2016.01) |

(52) U.S. Cl.
CPC ............. *H01F 27/28* (2013.01); *H01F 27/08* (2013.01); *H01F 27/24* (2013.01); *H02J 50/10* (2016.02); *H02J 50/70* (2016.02)

(58) Field of Classification Search
CPC .......... H01F 27/28; H01F 27/08; H01F 27/24; H01F 38/14; H01F 27/38; H01F 27/255; H02J 50/10; H02J 50/70
See application file for complete search history.

(56) References Cited

U.S. PATENT DOCUMENTS

| | | | |
|---|---|---|---|
| 5,917,307 A | 6/1999 | Watanabe | |
| 7,164,331 B2 * | 1/2007 | Reddy | H03H 7/463 |
| | | | 336/212 |
| 2009/0072628 A1 | 3/2009 | Cook | |
| 2013/0328412 A1 | 12/2013 | Meins | |
| 2015/0145342 A1 | 5/2015 | Chiyo et al. | |
| 2015/0170833 A1 | 6/2015 | Widmer et al. | |
| 2018/0197673 A1 * | 7/2018 | Njiende | H01F 27/24 |
| 2018/0301940 A1 * | 10/2018 | Yeo | H02J 50/60 |
| 2018/0331578 A1 * | 11/2018 | Covic | B60L 53/38 |
| 2019/0082555 A1 | 3/2019 | Hooton et al. | |

FOREIGN PATENT DOCUMENTS

| | | |
|---|---|---|
| DE | 102011107620 A | 1/2013 |
| JP | 3937771 B2 * | 6/2007 |
| WO | WO 2011/112795 A1 | 9/2011 |
| WO | WO 2013/019122 A1 | 2/2013 |
| WO | WO 2015/087138 A2 | 6/2015 |

* cited by examiner

*Primary Examiner* — Tuyen T Nguyen (74) *Attorney, Agent, or Firm* — Nixon Peabody LLP (57) ABSTRACT

A coil arrangement with reduced losses and a stabilized coupling factor. For this purpose, the arrangement has a coil core and a first winding, the turns of which are distributed over several sections which are spaced apart from one another.

15 Claims, 6 Drawing Sheets

COIL ARRANGEMENT WITH REDUCED LOSSES AND A STABILIZED COUPLING FACTOR, AND SYSTEM FOR WIRELESS POWER TRANSFER

The invention relates to a coil arrangement with reduced losses and a stabilized coupling factor, as can be used, for example, in systems for wireless power transfer, and to corresponding systems for wireless power transfer.

Systems for wireless transfer of power, for example electrical power, usually have a primary coil arrangement and a secondary coil arrangement. A magnetic field which changes over time is emitted by the primary coil arrangement and received by the secondary coil arrangement. In so doing, the primary coil arrangement and the secondary coil arrangement do not have to be electrically interconnected and can be spaced apart from one another.

In this case, it is possible for one or more of the coil arrangements to have one or more windings around a coil core. Typical materials of coil cores consist of or comprise ferrite. In this case, a specific amount of transferred power is generally dissipated, that is to say converted into heat, in the coil core. Furthermore, non-optimal orientation between the primary and the secondary coil arrangement results in a variable coupling factor.

One possible way of reducing the power loss involves increasing the volume of the ferrite core. One possible way of reducing the variability in the coupling factor is the use of coils with a generally low coupling factor, such as, for example, DD (double-D) coils or annular coils, the turns of which are arranged substantially in one plane.

However, firstly, an increased volume of the coil core leads to an increase in the cost of corresponding systems since more ferrite material is required. Furthermore, the construction is increased in size, this running contrary to the trend for miniaturization of components. Moreover, an increased volume makes it more difficult to discharge the heat which is produced by the power loss.

Secondly, the use of coils with a low coupling factor leads to transfer systems with a low level of magnetic coupling.

Therefore, there is a desire for coil arrangements with reduced losses and a relatively high, yet stable, coupling factor. In particular, there is a demand for coil arrangements which require less ferrite in the coil core, which can ensure good discharge of heat at the same time, which have a reduced mass and which can be easily integrated into systems, can be provided at reduced costs and which can also be operated in the case of variable orientations between the primary coil arrangement and the secondary coil arrangement with a stable and high coupling factor.

To this end, the invention specifies a coil arrangement according to the independent claim. Dependent claims specify advantageous refinements.

The coil arrangement has a coil core and a first winding. The turns of the first winding are wound around an axis. In this case, the turns of the first winding are distributed over several sections and the sections of the first winding are spaced apart from one another.

Spatial distribution of turns of the winding of a coil arrangement in this way leads to distribution of the associated magnetic flux over a relatively large volume. Therefore, the magnetic flux density is reduced. The power loss in coil cores of coil arrangements is determined by the Steinmetz equation. Here, the power loss is proportional to $B_m^y$, where $B_m$ is the magnetic flux density and y is a material constant of the coil core. For a typical ferrite material, for example PC95, y is approximately 2.84. That is to say, the power loss is overproportional to the magnetic flux density and distribution of a magnetic flux of a certain amount over a relatively large volume leads to a reduced power loss owing to the reduction in the maximum flux density.

Distributing the turns of the first winding into sections which are spaced apart from one another further has the effect that corresponding coupling factors are reduced. In this case, the reduction is greater in the case of high coupling factors than in the case of relatively low coupling factors. The range of the coupling factors—depending on the orientation in relation to a primary coil arrangement of a WPT system—is therefore reduced. At the same time, a coil type with a generally relatively high coupling factor, for example a solenoid coil, can be used.

Therefore, a coil arrangement with low losses and relatively low fluctuation in the coupling factor with, nevertheless, a high coupling value is obtained overall.

In this case, each section of the first winding can have a helical first winding with one or more layers.

It is possible for the coil to consist virtually only of the spaced-apart sections between which no further complete turn—but possibly electrical connections—is/are arranged.

It is possible for the axis to run through the coil core.

Accordingly, it is also possible for the coil core to comprise a ferrite material or consist of a ferrite material. The ferrite material can be selected from the following materials: ferrite N87 from the TDK Corporation, ferrite N95 from the TDK Corporation, ferrite N97 from the TDK Corporation, ferrite PC47 from the TDK Corporation, ferrite PC95 from the TDK Corporation.

It is possible for the coil core to be selected from amongst a cylindrical coil core, a plate-like coil core, a plate-like coil core with a rectangular base area.

Plate-like coil cores with a rectangular base area virtually constitute squares with a length, a width and a thickness. Accordingly, it is possible for the coil core to have a rectangular base area with a width b and a length l. In this case, the coil core can further have a thickness d. The width can be 200 mm or more and 300 mm or less. The length can be 350 mm or more and 450 mm or less. The thickness can be 9 mm or more and 15 mm or less.

In particular, the width can be 250 mm, the length can be 400 mm and thickness can be 12 mm.

The number of sections can be two, three, four, five or six or more.

In particular, it is possible for the number of sections to be precisely two.

It is possible for two sections of the first winding to be arranged on opposite sides of the coil core.

In particular, it is possible here for two sections to be arranged on opposite sides of the coil core and for the two opposite sides to be at the greatest distance of sides of a cuboidal coil core.

It is possible for the distance between sections of the first winding in units of the length l of the coil core to be greater than 0 and less than 0.9. As an alternative or in addition, it is possible for the distance in units of l to be 0.2 or greater and 0.9 or less. Furthermore, it is possible for the distance in units of l to be 0.4 or greater and 0.9 or less. Furthermore, it is possible for the distance in units of l to be 0.6 or greater and 0.9 or less. Furthermore, it is possible for the distance in units of l to be 0.8 or greater and 0.9 or less.

A preferred distance in units of l is 0.6.

It is possible for a section to have a spatial extent in the direction of the winding axis of 0.15 or more and 0.25 or less in units of l. An extent in the direction of the winding axis can be 0.2 l in this case.

It is possible for the coil arrangement to further comprise a thermal bridge. The thermal bridge can be arranged in the axial direction, that is to say in a direction along the first winding axis, between two sections of the first winding and on the coil core. In particular, it is possible for the thermal bridge to be intended and suitable for discharging heat from the coil core to an external surrounding area.

In this case, the external surrounding area of the coil arrangement can be an atmosphere, for example air, which surrounds the coil arrangement.

Furthermore, it is possible for the coil arrangement to be attached to an apparatus. The thermal bridge can then be intended and suitable for giving off heat from the coil core to the apparatus and to the atmosphere. In this case, the thermal bridge can have cooling fins.

In this case, the apparatus to which the coil arrangement can be attached can be the receiver of the electrical power which the coil arrangement receives in the form of magnetic power. Therefore, for example, a rechargeable power store of a vehicle or another moving object can be charged.

It is possible for the coil arrangement to comprise a second winding with one or more sections.

It is possible for the second winding to comprise two or more sections.

It is possible for the sections of the second winding to be spaced apart from one another.

It is possible for the sections of the second winding to be spaced apart from sections of the first winding.

It is possible for the turns of the sections of the second winding to also be wound around the axis of the first winding in the coil arrangement.

It is possible for the coil core to also be the core for the turns of the sections of the second winding.

It is possible for the coil arrangement to further comprise a switch.

It is possible for the sections of the first winding and/or the sections of the second winding to be able to be activated using the switch.

It is likewise possible for the sections of the second winding to be connected between the sections of the first winding using the switch.

The presence of the second winding renders it possible to select the active sections depending on the orientation of the coil arrangement—as a secondary coil arrangement—in relation to a primary coil arrangement, so that sections of the coil arrangement are active, and therefore the coupling factor can be kept in a yet narrower region.

In this way, the fluctuation range of the coupling is reduced—with, nevertheless, a relatively high coupling factor.

In this way, the stress on windings and matching networks in WPT systems is reduced. Therefore, good transfer efficiency can be obtained with a matching network which is constructed in a simple manner and is easy to control.

Accordingly, it is possible for the coil arrangement to be a secondary coil arrangement of a system for wirelessly transferring electrical power.

Accordingly, a system for wirelessly transferring electrical power can have a coil arrangement as described above as a secondary coil arrangement and can additionally have a primary coil arrangement.

In this case, it is possible for the primary coil arrangement to comprise a double-D coil arrangement, a solenoid coil, a spiral coil or a circular coil which has two coil sections which, in contrast to the secondary coil arrangement described above, are not coaxially wound, but rather the two windings of which are arranged next to one another in the same plane.

Central aspects of the coil arrangement and details of preferred embodiments will be explained in more detail with reference to the schematic figures,
in which.

Figure 1:
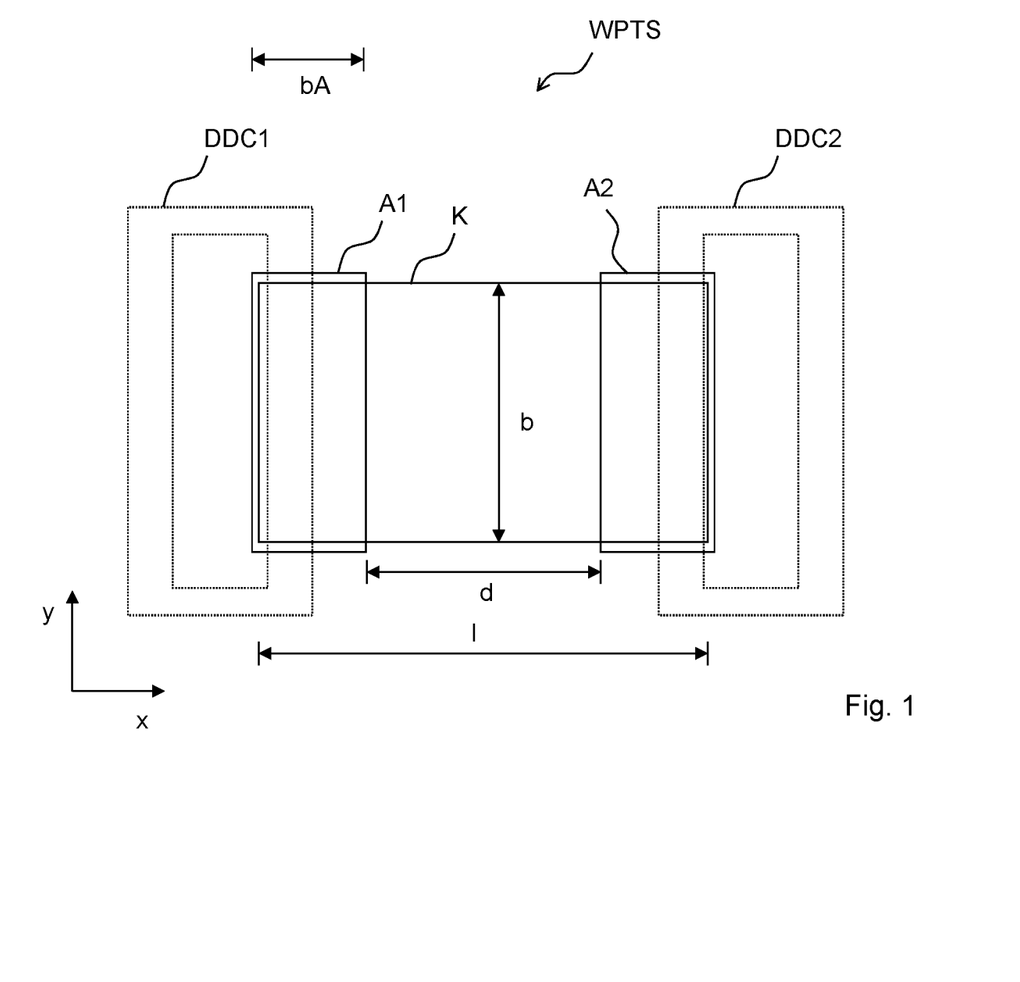
FIG. 1 shows a plan view of the relative arrangement of the coil core and the sections.

FIG. 1 shows a plan view of the arrangement of the two sections A1, A2 of a coil, the first winding of which is distributed over two sections, in relation to the associated coil core K. The coil core K has a rectangular base area with a length—in the axial direction x-l and a width—in the lateral direction y-b. The two sections A1, A2 of the first winding are arranged at the ends of the coil core K which are at the greatest distance from one another. In this case, the sections are at the distance d. Here, FIG. 1 shows a form of the coil arrangement with precisely two sections.

The two sections DDC1, DDC2 of a primary coil arrangement of double-D configuration are illustrated in dashed lines. The coil sections DDC1, DDC2 of the primary coil arrangement form, together with the two sections A1, A2 and the coil core K of the coil arrangement as a secondary coil arrangement, the magnetically active components of a system for wirelessly transferring electrical power WPTS (Wireless Power Transfer System).

Distributing the first winding of the secondary coil arrangement into two spaced apart sections causes distribution of the magnetic flux over a relatively large volume, especially in the coil core K, so that the magnetic flux density in the coil core K is reduced. On account of the overproportional dependency of transfer losses on the magnetic flux density, this therefore results in a reduction in power losses when transferring electrical power.

Figure 2:
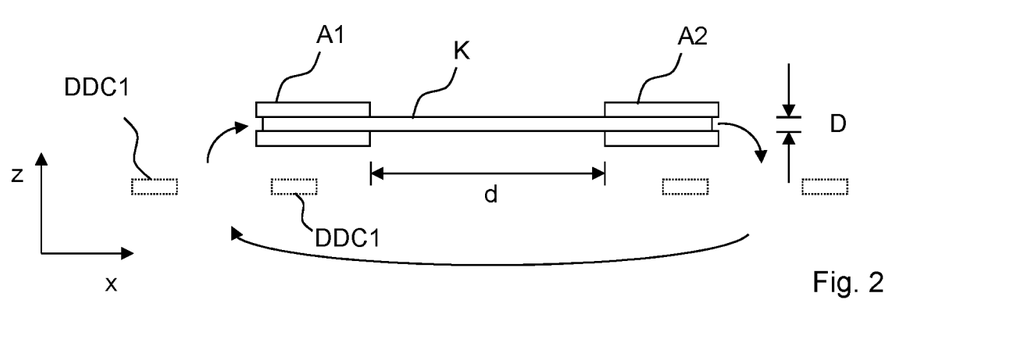
FIG. 2 shows a cross section through the arrangement.

FIG. 2 shows a cross section through the arrangement of the components of the power transfer system. In this case, each of the two sections A1, A2 of the first winding of the coil arrangement has conductor sections which, as seen in the vertical direction z, are arranged above the material of the magnet core K and conductor sections which are arranged below the magnet core K.

In this case, the sections do not have to terminate flush with the magnet core K in the axial direction x. It is possible for the sections of the first winding to protrude beyond the respective ends of the coil core (as shown in FIG. 2). However, it is also possible for the coil core to terminate precisely flush with the sections at the respective ends. It is also possible for the coil core K to protrude beyond each of the distal ends of the sections A1, A2.

The arrows illustrate substantially the course of the magnetic field lines at a specific point in time.

Figure 3:
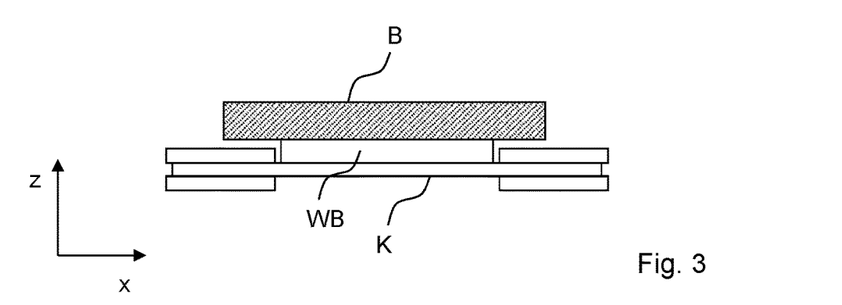
FIG. 3 shows the use of a thermal bridge.

FIG. 3 shows a possible way of using a thermal bridge WB in order to discharge dissipated power, which collects in the form of heat in the coil core K, to an external surrounding area. The external surrounding area can be, in particular, a mounting base B of an apparatus to which the coil arrangement outputs electrical power.

Figure 4:
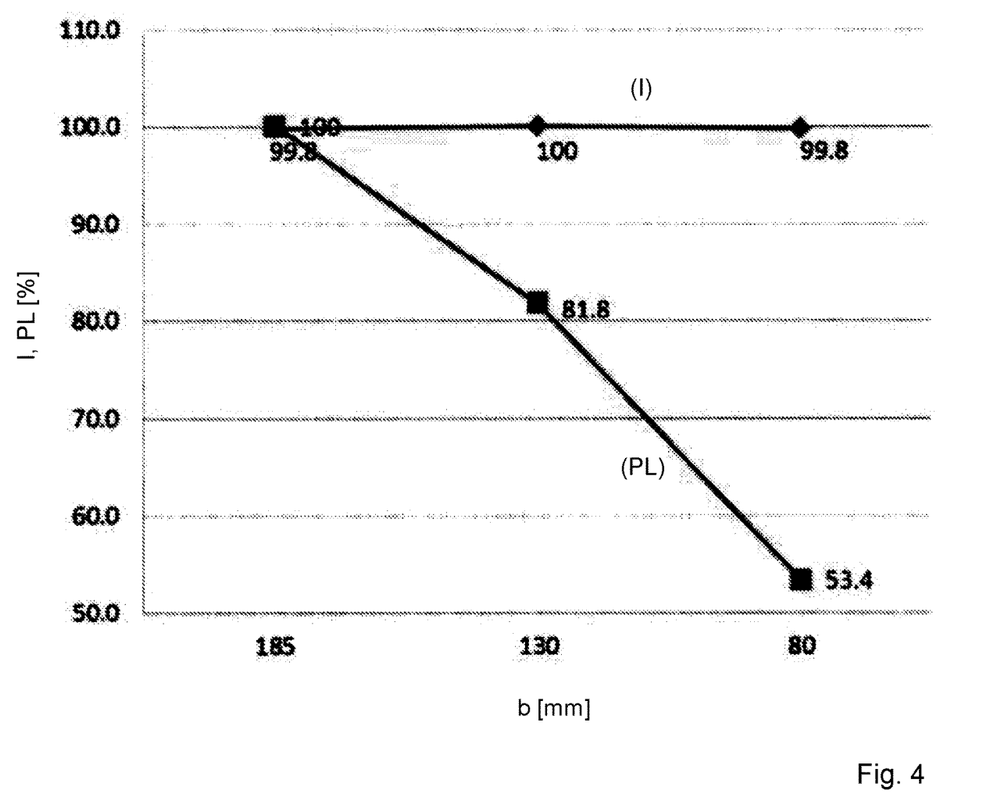
FIG. 4 shows the dependency of the inductance and the losses of a coil arrangement on the extent of a section in the axial direction.

FIG. 4 shows the dependency of the inductance I and the power losses PL on the width b of a winding section of a secondary coil arrangement of a wireless power transfer system. While the inductance remains substantially constant, the power loss drops as the width b decreases. That is to say, distributing a first winding of a specific width into two sections which are spaced apart from one another and each have a relatively low width considerably reduces the power losses.

Figure 5:
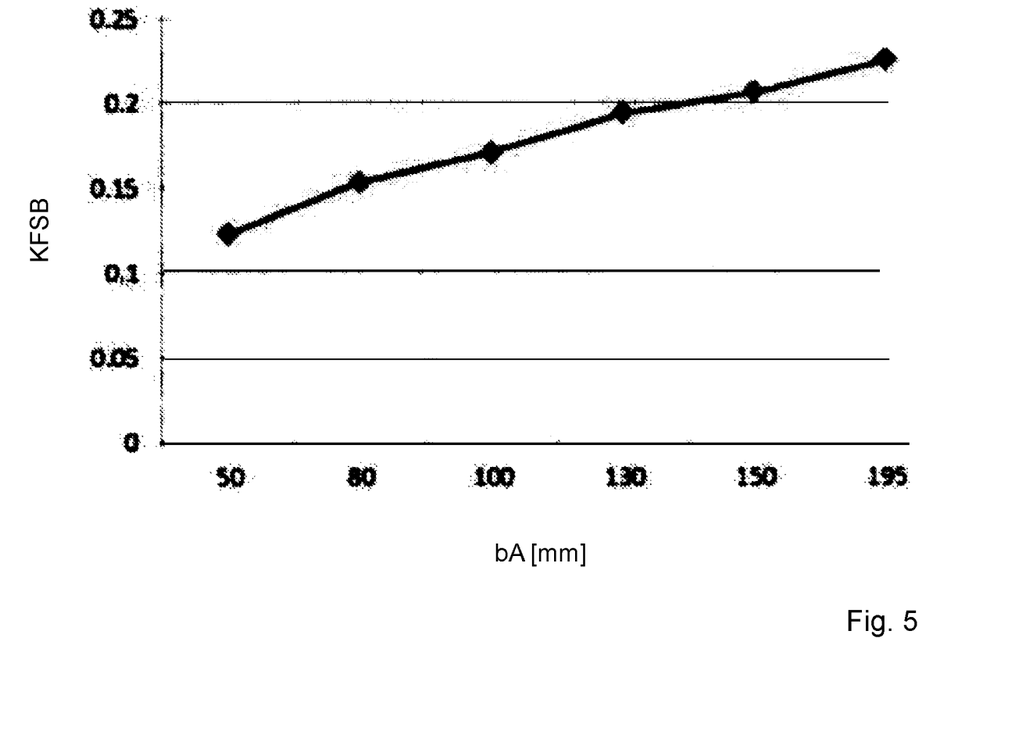
FIG. 5 shows the dependency of the fluctuation range of the coupling factor on the width of a winding section.

FIG. 5 shows the dependency of the width of the fluctuation range KFSB of the coupling factor on the width bA (that is to say the extent in the x direction) of a section of a winding. A reduction in the width is accompanied by a reduction in the variation in the coupling given a varied orientation between the primary and the secondary coil arrangement.

Figure 6:
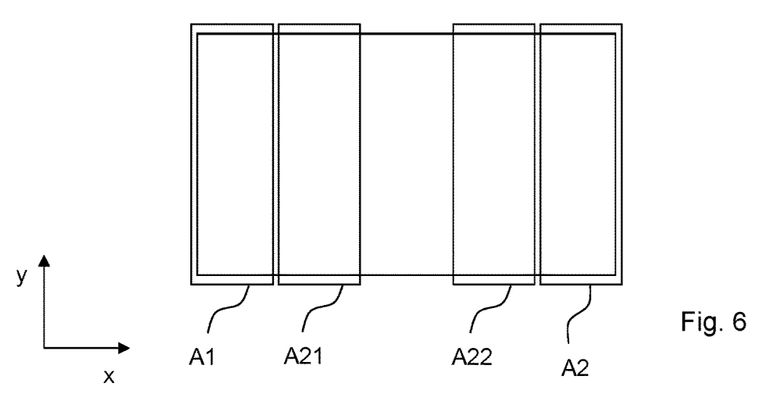
FIG. 6 shows a plan view of a coil arrangement with two windings.
Figure 7:
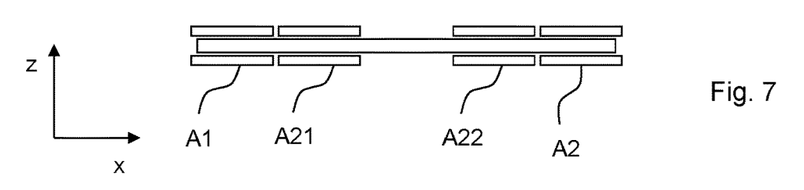
FIG. 7 shows a cross section through a coil arrangement with two windings.

FIGS. 6 (in plan view) and 7 (in cross section) show a coil arrangement which, in addition to the first winding with the sections A1 and A2, also further has the sections A21 and A22 of a second winding. The possibility of activating different sections of the windings by switch allows the corridor of the coupling factors to be yet further narrowed, so that operation can be further stabilized.

Figure 8:
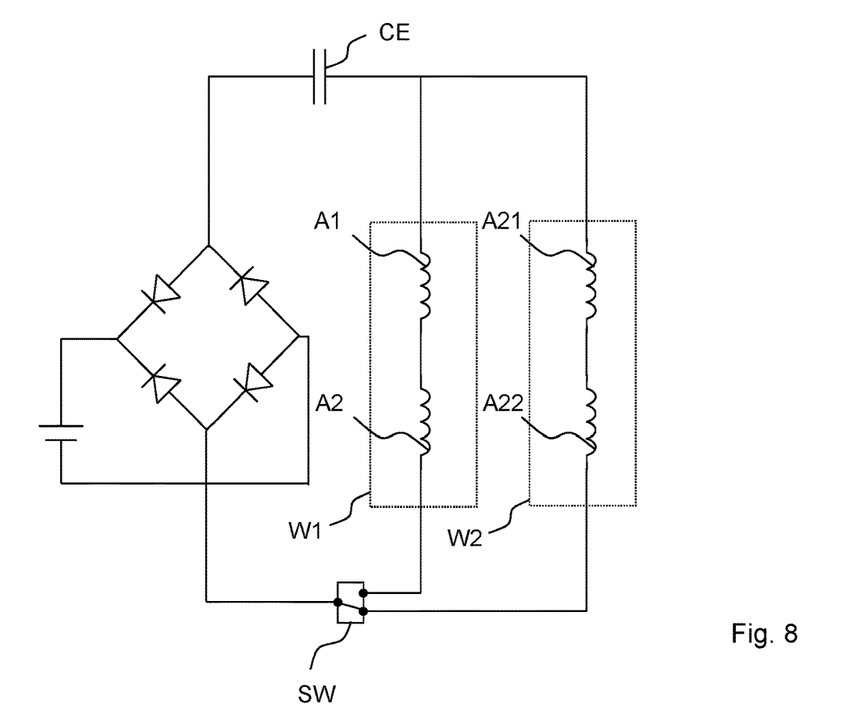
FIG. 8 shows a possible interconnection of the sections of two windings.

FIG. 8 shows a possible interconnection of the sections of the windings when used on the receiver side of a WPT system. Either the first winding W1 with the sections A1 and A2 or the second winding with the sections A21 and A22 can be activated by means of the switch SW. The choice between the first and the second winding can be made, for example, on the basis of the spatial arrangements of the sections for arranging a primary coil.

A capacitive element CE can serve as a matching element or as part of a matching network. The four diodes in rectifier arrangement then provide a DC voltage.

Figure 9:
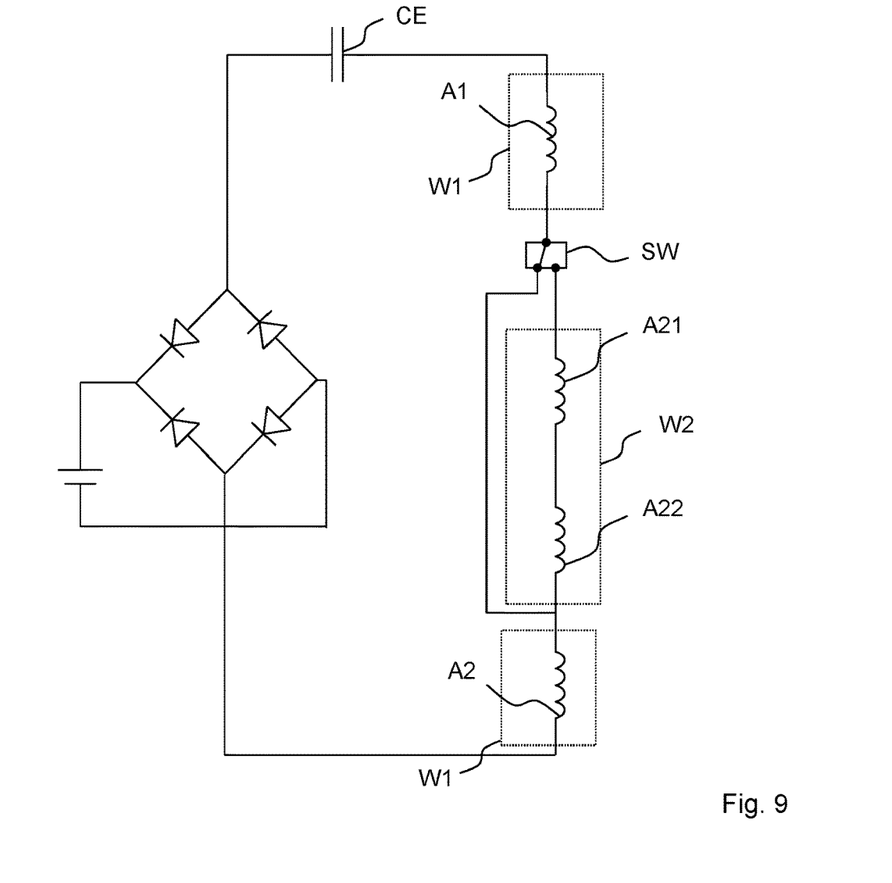
FIG. 9 shows a further possible interconnection of the sections of two windings.

FIG. 9 shows a possible interconnection of the sections of the windings when used on the receiver side of a WPT system. Either only the first winding W1 with the sections A1 and A2 is active by means of the switch SW, or the sections A21, A22 of the second winding are interconnected in series between the sections A1, A2 of the first winding. The choice between the switch position can be made, once again, on the basis of the spatial arrangements of the sections for arranging a primary coil.

A capacitive element CE can serve as a matching element or as part of a matching network. The four diodes in rectifier arrangement then provide a DC voltage.

Figure 10:
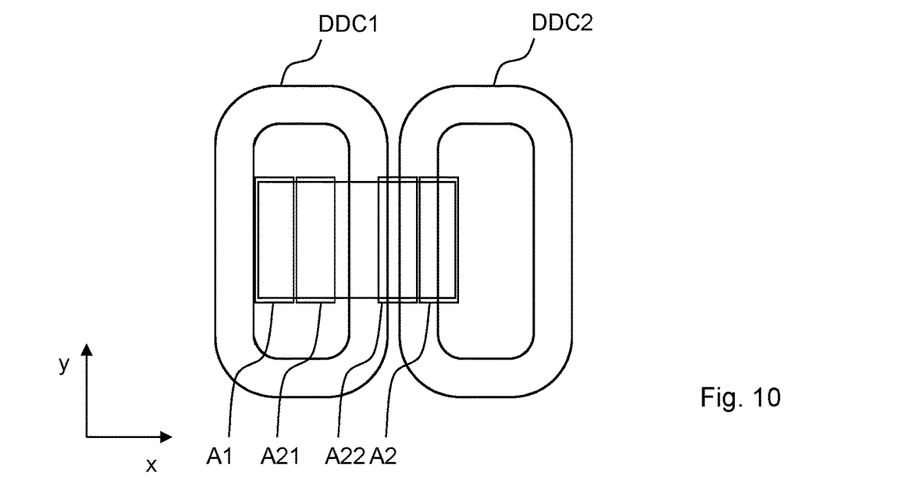
FIGS. 10 and 11 show the variable orientation of the coil arrangement relative to a primary coil arrangement.
Figure 11:
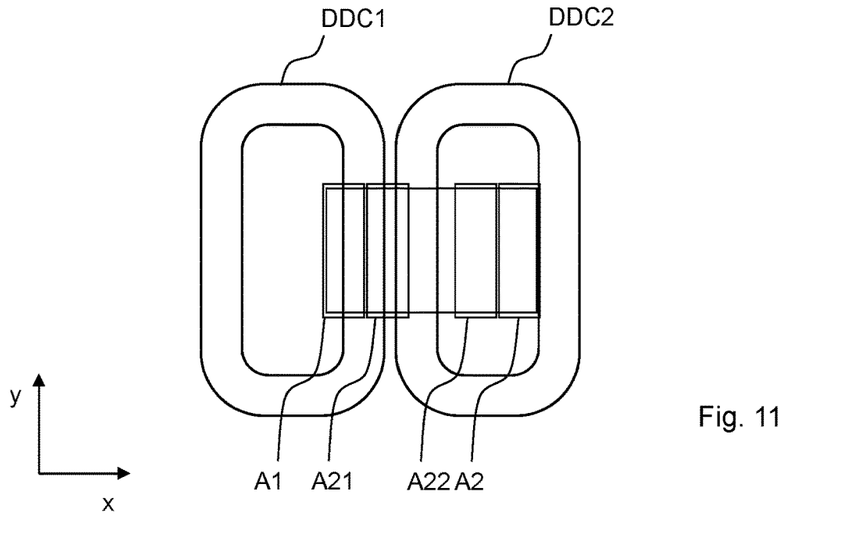

FIGS. 10 and 11 show possible orientations of the coil arrangement as a secondary coil arrangement of a WPT system relative to the DD coil with the coil sections DDC1, DDC2 of a primary coil arrangement of the WPT system. In this case, the sections A1 and A2 can be active when the height difference between the transmitter (primary coil) and the receiver (secondary coil) is relatively low. Furthermore, the sections A21 and A22 can be active when the height difference is relatively high.

As an alternative, it is possible—using several switches—for the two sections A1 and A21 to be able to be used together or the sections A22 and A2 to be able to be used together, depending on the orientation in relation to the transmitter.

Therefore, it is possible, in spite of a large number of different—here variable—orientations of the secondary coil arrangement, to obtain a good coupling factor in a narrow range.

Figure 12:
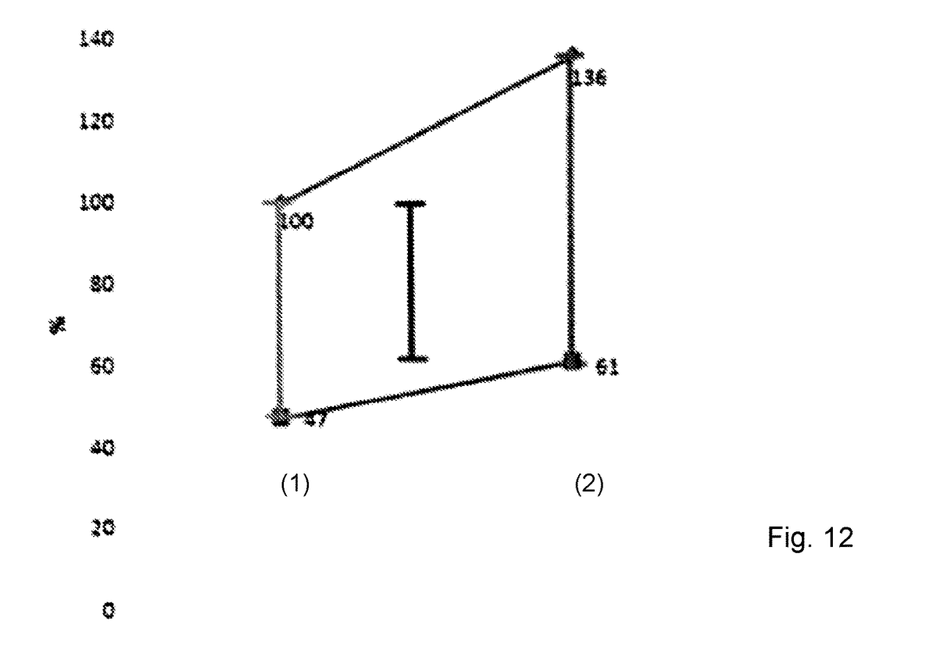
FIG. 12 shows the resulting, reduced fluctuation range of the magnetic coupling factor of a coil arrangement with two windings.

FIG. 12 accordingly shows the possible coupling factors for the first winding 1 and for the second winding 2 for different orientations of the coil arrangement. For example, the coupling factor for the first winding can vary between 47% and 100%. The coupling factor for the second winding can vary between 61% and 136%. Owing to the possibility of switching sections over, a switch position can be found for each possible orientation of the secondary coil arrangement, so that the coupling factor is between 61% and 100%.

The coil arrangement is not restricted to the technical features shown in the figures or described above. The coil arrangement can have further turns with further sections, switches, conductor sections, for example for electrically interconnecting the sections, electrical connections for interconnection with an external circuit surrounding area, further elements for guiding the magnetic flux or attachment options for making contact.

What is claimed is:

1. A coil arrangement with reduced losses and a stabilized coupling factor, comprising:
    a coil core;
    a first winding having turns, the turns of the first winding being wound around an axis running through the coil core, wherein the turns of the first winding are distributed over two or more sections and the sections are spaced apart from one another;
    a second winding having two or more sections, wherein turns of the sections of the second winding are wound around the axis of the first winding; and
    a switch configured to (a) activate either the sections of the first winding or the two or more sections of the second winding, or (b) connect the sections of the first winding to the two or more sections of the second winding,
    wherein at least one of the sections of the second winding is arranged between sections of the first winding along the axis.

2. The coil arrangement according to claim 1, which consists only of the spaced-apart sections and electrical connections without a complete turn.

3. The coil arrangement according to claim 1, wherein the coil core comprises a ferrite material.

4. The coil arrangement according to claim 1, wherein the coil core is selected from amongst a cylindrical coil core, a plate-like coil core, a plate-like coil core with a rectangular base area.

5. The coil arrangement according to claim 4, wherein the coil core is plate-like and has a rectangular base area with a width b of 200 mm≤b≤300 mm, a length l of 350 mm≤l≤450 mm and a thickness d of 9 mm≤d≤15 mm.

6. The coil arrangement according to claim 5, wherein the number of sections is 2, 3, 4, 5, 6 or more.

7. The coil arrangement according to claim 1, wherein two sections are arranged on opposite sides of the coil core.

8. The coil arrangement according to claim 1, wherein the coil core has a length l in the direction of the axis and the distance d between sections of the winding is:

0<d≤0.9 l or
0.2 l≤d≤0.9 l or
0.4 l≤d≤0.9 l or
0.6 l≤d≤0.9 l or
0.8 l≤d≤0.9 l.

9. Coil arrangement according to claim 1, further comprising a thermal bridge which is arranged in the axial direction between two sections of the winding and on the coil core and is intended and suitable for discharging heat to an external surrounding area.

10. Coil arrangement according to claim 1, wherein the sections of the second winding are spaced apart from one another.

11. Coil arrangement according to claim 1, wherein the sections of the second winding are spaced apart from sections of the first winding.

12. Coil arrangement according to claim 1, in which the coil core is also the core for the turns of the sections of the second winding.

13. Coil arrangement according to claim 1, which is a secondary coil arrangement of a system for wirelessly transferring electrical power.

14. A coil arrangement with reduced losses and a stabilized coupling factor, comprising
a coil core defining an axis;
a first winding having turns that are wound around the axis of the coil core, the turns of the first winding being grouped into at least a first section and a second section, the first section being separated from the second section by a region that lacks the turns of the first winding;
a second winding having turns that are wound around the axis of the coil core, the turns of the second winding being grouped into at least a third section and a fourth section, the third section being separated from the fourth section by a region that lacks the turns of the second winding; and
a switch positioned between the first section and the second section and configured to either (a) bypass the second winding by connecting the first section to the second section, or (b) arrange the first winding and the second winding in series by connecting the first section to the third section,
wherein the fourth section is connected to the second section,
wherein the first section and the second section are arranged at opposing ends of the coil core, and the third section and the fourth section are situated between the first section and the second section.

15. A coil arrangement with reduced losses and a stabilized coupling factor, comprising
a coil core defining an axis;
a first winding having turns that are wound around the axis of the coil core, the turns of the first winding being grouped into at least a first section and a second section, the first section being separated from the second section by a region that lacks the turns of the first winding;
a second winding having turns that are wound around the axis of the coil core, the turns of the second winding being grouped into at least a third section and a fourth section, the third section being separated from the fourth section by a region that lacks the turns of the second winding; and
a switch positioned between the second section and the fourth section and configured to activate either (a) the first winding by connecting the second section and floating the fourth section, or (b) the second winding by connecting the fourth section and floating the second section,
wherein the first section is connected to the third section,
wherein the first section and the second section are arranged at opposing ends of the coil core, and the third section and the fourth section are situated between the first section and the second section.

* * * * *

UNITED STATES PATENT AND TRADEMARK OFFICE
CERTIFICATE OF CORRECTION

PATENT NO. : 11,961,650 B2
APPLICATION NO. : 17/032365
DATED : April 16, 2024
INVENTOR(S) : Thomas Lohmann It is certified that error appears in the above-identified patent and that said Letters Patent is hereby corrected as shown below:

In the Claims

At Column 6, Lines 48-50 (Claim 2), delete "which consists only of the spaced-apart sections and electrical connections without a complete turn" and insert --wherein electrical connections between the sections of the turns of the first winding are without a complete turn around the axis-- therefor.

At Column 6, Line 61 (Claim 6), insert --of the first winding-- after "number of sections".

At Column 6, Line 64 (Claim 7), insert --of the first winding-- after "two sections".

At Column 7, Line 6 (Claim 9), delete "Coil" and insert --The coil-- therefor.

At Column 7, Line 8 (Claim 9), delete "two sections of the winding" and insert --two sections of the first winding-- therefor.

At Column 7, Line 11 (Claim 10), delete "Coil" and insert --The coil-- therefor.

At Column 7, Line 14 (Claim 11), delete "Coil" and insert --The coil-- therefor.

At Column 7, Line 17 (Claim 12), delete "Coil arrangement according to claim 1, in which" and insert --The coil arrangement according to claim 1, wherein-- therefor.

At Column 7, Line 18 (Claim 12), delete "the turns of the sections" and insert --the turns of the one or more sections-- therefor.

At Column 7, Line 20 (Claim 13), delete "Coil" and insert --The coil-- therefor.

Signed and Sealed this
Eighteenth Day of June, 2024

Katherine Kelly Vidal
*Director of the United States Patent and Trademark Office*